(12) United States Patent
Konno et al.

(10) Patent No.: US 7,450,286 B2
(45) Date of Patent: Nov. 11, 2008

(54) LASER PROJECTION APPARATUS

(75) Inventors: Kenji Konno, Sakai (JP); Ichiro Fujiyo, Moriguchi (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 12/002,577

(22) Filed: Dec. 18, 2007

(65) Prior Publication Data

US 2008/0158524 A1    Jul. 3, 2008

(30) Foreign Application Priority Data

Dec. 28, 2006  (JP)  ............... 2006-354627

(51) Int. Cl.
*G02B 26/08* (2006.01)
*G03B 21/28* (2006.01)

(52) U.S. Cl. .................. 359/208; 359/207; 353/99

(58) Field of Classification Search .............. None
See application file for complete search history.

(56) References Cited

U.S. PATENT DOCUMENTS

| 6,859,329 | B2 * | 2/2005 | Kobayashi | 359/635 |
|---|---|---|---|---|
| 7,264,360 | B2 | 9/2007 | Hatakeyama et al. | 353/99 |
| 7,385,745 | B2 * | 6/2008 | Ishihara | 359/202 |
| 2006/0139718 | A1 | 6/2006 | Ishihara | 359/205 |
| 2008/0143979 | A1 * | 6/2008 | Konno | 353/98 |

FOREIGN PATENT DOCUMENTS

| JP | 2004-252012 A | 9/2004 |
|---|---|---|
| JP | 2006-178346 A | 7/2006 |

* cited by examiner

*Primary Examiner*—James Phan
(74) *Attorney, Agent, or Firm*—Sidley Austin LLP

(57) ABSTRACT

A laser projection apparatus includes: laser devices; incident optical systems, each of which is supplied with light beam from the laser device; a scanning device for two-dimensionally scanning the light beam; and a projection optical system for projecting the light beam from the scanning device onto a screen; wherein the scanning device includes a resonant drive mirror for performing deflection in a main scanning direction, and the projection optical system includes at least two non-axisymmetric-shaped reflecting mirrors and a light source image is present between the first mirror, which is most closest to the scanning device, and the second mirror, thereby achieving a laser projection apparatus using a projection optical system which is easy to downsize, has velocity uniformity and has successful projection characteristics and brightness.

10 Claims, 9 Drawing Sheets

LASER PROJECTION APPARATUS

BACKGROUND OF THE INVENTION

1. Field of the Invention

The present invention relates to a laser projection apparatus for projecting an image onto a screen by two-dimensional scanning of light, the apparatus being applicable to image projection apparatuses such as pocket projectors, data projectors and rear projection televisions.

2. Description of the Related Art

Small-size image projection apparatuses for projecting an image by two-dimensional deflection scanning of light derived from a light source have been proposed in various types (e.g., the following Patent Documents 1 and 2). Generally, galvanomirrors or MEMS (Micro Electro Mechanical Systems) mirrors are used as an optical scanning means. In order that a galvanomirror or MEMS mirror is used with high speed and large amplitude (i.e., mechanical deflection angle), a drive method using resonance is employed. However, it is known that using such a resonant drive method would involve decreasing in the scanning velocity in the vicinities of maximum and minimum values of amplitude (i.e., peripheries of the image). This leads to problems, as commonly known, that the brightness of screen becomes higher in its peripheries than in its center, or that there may occur differences in resolution between the center and the peripheries on condition that the modulation rate of the light source is maintained constant.

For elimination of nonuniformities in brightness and resolution with a deflection scanning means using a resonant drive mirror, there is a need for applying a successful compensation by using an optical system to achieve a velocity uniformity on a scanning surface. More specifically, it is preferable that the projection optical system has an f-arcsine θ characteristic.

A projection optical system according to Patent Document 1, which is composed of two mirrors and one refractive lens, or three mirrors, can fulfill the compensation of the velocity uniformity or distortion.

A projection optical system according to Patent Document 2, which is composed of four mirrors, or an integrated-type prism having four reflecting surfaces, can fulfill the compensation of the velocity uniformity or distortion.

The related prior arts are listed as follows: Japanese Patent Unexamined Publications (koukai) JP-2006-178346, A and JP-2004-252012, A.

However, in the optical system of Patent Document 1 described above, in which a plurality of scanning mirrors are used as a reflecting optical system, there arises a need for distances between the scanning mirrors to separate rays of light from one another, and optical elements increase in size with increasing distances from the deflection scanning means so that the whole projection optical system inevitably increases in size.

Also, in the optical system of Patent Document 2 described above, a light source image which is once formed in an optical path of the projection optical system is projected onto a screen. Therefore, in spite of four reflecting surfaces used in the system, the final-stage reflecting surface is not so large in size, compared with the system of Patent Document 1, but there are some unavoidable problems, for example, 1) the optical system in itself is increased in size because of as many as four scanning mirrors, 2) it is difficult to position four curved-surface mirrors with high precision, and 3) an optical system up to the light source image is increased in size because the light source image to be once formed in the optical path is distant from the deflection scanning means.

SUMMARY OF THE INVENTION

Accordingly, an object of the present invention is to provide a laser projection apparatus using a projection optical system which is easy to downsize, has velocity uniformity (arcsine characteristic) and has successful projection characteristics and brightness.

In order to achieve the above object, according to the present invention, there is provided a laser projection apparatus comprising:

a laser light source;

an incident optical system which is supplied with a light beam from the laser light source;

a scanning device for two-dimensionally scanning the light beam from the incident optical system; and a projection optical system for projecting the light beam from the scanning device onto a screen, wherein the scanning device includes a resonant drive mirror for performing deflection in a main scanning direction, and the projection optical system includes at least two nonaxisymmetric-shaped reflecting surfaces, and a light source image is present between the first reflecting surface, which is most closest to the scanning device, and the second reflecting surface.

In this invention, it is preferable that the projection optical system has such a power that, with respect to the main scanning direction, a positive power becomes increasingly greater toward peripheries of the main scanning direction.

Also in this invention, it is preferable that the first reflecting surface of the projection optical system has a positive power, and satisfies the following equation:

$$0 < (S1H \times f1H)/(S1H + f1H)/L12 < 1.0,$$

where $L12$ represents an optical path length of an optical-axis principal ray between the first reflecting surface and the second reflecting surface, $f1H$ represents a focal length of the first reflecting surface in a vicinity of the optical-axis principal ray, as measured in the main scanning direction, and $S1H$ represents an object distance of the light source image formed by the incident optical system from the first reflecting surface, as measured in the main scanning direction.

Further, in this invention, it is preferable that the first reflecting surface of the projection optical system has a positive power and satisfies the following equation:

$$0 < (S1V \times f1V)/(S1V + f1V)/L12 < 1.0,$$

where $L12$ represents an optical path length of an optical-axis principal ray between the first reflecting surface and the second reflecting surface, $f1V$ represents a focal length of the first reflecting surface in a vicinity of the optical-axis principal ray, as measured in the sub scanning direction, and $S1V$ represents an object distance of the light source image formed by the incident optical system from the first reflecting surface, as measured in the sub scanning direction.

Further, in this invention, it is preferable that the first reflecting surface of the projection optical system satisfies the following equation:

$$0 < f1V/f1H < 1,$$

where $f1H$ represents a focal length of the first reflecting surface in a vicinity of the optical-axis principal ray, as measured in the main scanning direction, and $f1V$ represents a focal length of the first reflecting surface in a vicinity of the optical-axis principal ray, as measured in the sub scanning direction.

Also in this invention, it is preferable that the incident optical system has a power in the main scanning direction and a power in the sub scanning direction, one power being different from another power.

Also in this invention, it is preferable that the incident optical system supplies the scanning device with light convergent in the main scanning direction.

Also in this invention, it is preferable that the incident optical system satisfies the following equation:

$$20 < Sh/d < 80,$$

where Sh represents an object distance in the main scanning direction which is a distance from the scanning device to the light source image formed by the incident optical system, as measured in the main scanning direction, and d represents a pupil diameter.

Also in this invention, it is preferable that the incident optical system satisfies the following equation:

$$|0.05| > d/Sv,$$

where Sv represents an object distance in the sub scanning direction which is a distance from the scanning device to the light source image formed by the incident optical system, as measured in the sub scanning direction, and d represents a pupil diameter.

Also in this invention, it is preferable that the incident optical system satisfies the following equation:

$$1.2 < PwH/PwV < 7.0,$$

where PwH represents an absolute value of the incident optical system power, as measured in the main scanning direction, and PwV represents an absolute value of power of the incident optical system, as measured in the sub scanning direction.

According to the present invention, there can be realized a laser projection apparatus which is capable of reducing the size of the projection optical system and projecting an image having less distortion and uniform brightness on the screen.

BRIEF DESCRIPTION OF THE DRAWINGS

FIG. 1A is a side view thereof and FIG. 1B is a plan view thereof;

FIG. 3A is a side view thereof and FIG. 3B is a plan view thereof;

FIG. 8A is a side view thereof and FIG. 8B is a plan view thereof;

FIG. 10A is a side view thereof and FIG. 10B is a plan view thereof;

DETAILED DESCRIPTION OF THE PREFERRED EMBODIMENTS

Figure 1A:
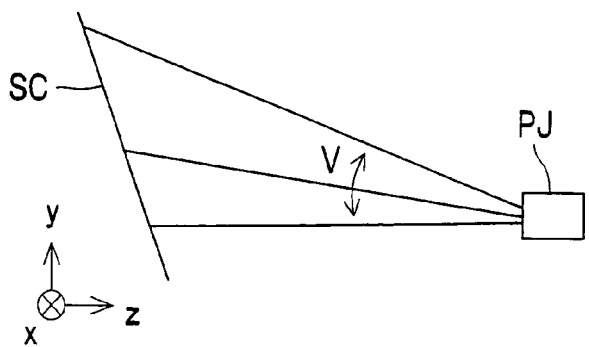
FIGS. 1A and 1B are overall views showing a first embodiment of the present invention, where

This application is based on an application No. 2006-354627 filed Dec. 28, 2006 in Japan, the disclosure of which is incorporated herein by reference.

Hereinafter, preferred embodiments will be described with reference to drawings.

A laser projection apparatus according to the present invention includes a laser source, an incident optical system which is supplied with a light beam from the laser light source, a scanning device for two-dimensionally scanning the light beam from the incident optical system, a projection optical system for projecting the light beam from the scanning device.

The scanning device, which has a function of deflecting a light beam in a main scanning direction as well as a function of deflecting a light beam in a sub scanning direction intersecting the main scanning direction, can be composed of, for example, a MEMS (Micro Electro Mechanical Systems) mirror. The scanning device may also be built up in either a structure that both a main scanning mirror and a sub scanning mirror are provided independently of each other, or another structure that a single mirror is attached with both a main scanning drive mechanism and a sub scanning drive mechanism.

With respect to the scanning direction, it may be set that a sub scanning direction is horizontal while a sub scanning direction is vertical, as in general displays, or that a main scanning direction is vertical while a sub scanning direction is horizontal, or that both main and sub scanning directions are neither horizontal nor vertical.

The following description will be given, for easy understanding, on an exemplary case in which a main scanning direction is set to H (horizontal) direction and a sub scanning direction is set to V (vertical) direction.

Conventionally, a projector using a DMD (Digital Micromirror Device) or liquid crystal device has been known as a small-sized projection apparatus. The so-called micro-display system that involves image projection in magnification of DMD or liquid crystal screen has limitations, because the need for projection of a two-dimensional image involves increasing in size of the illumination optical system or the projection optical system.

Meanwhile, projectors of the so-called laser scanning system, which scan using a small mirror, such as MEMS mirror, and modulate the brightness of the laser source in synchronization with scanning, can be downsized. Features of this type of projector are that the scanning mirror is smaller in comparison to DMDs or the like, that the light source is a laser and the illumination optical system, serving only for illuminating the scanning mirror, is also reduced in size, and that the projection optical system, also serving only for performing point scanning, is reduced in size in comparison to two-dimensional projection optical systems.

Using the above scanning system makes it possible to realize a small-size projection apparatus. Further, projection of bright, high-resolution and high-quality images is desired.

For output of a high-resolution image by two-dimensional scanning of a deflection scanning mirror, such as MEMS mirror, (or by a combination of two mirrors), scanning operation needs to be driven at a low speed in the longitudinal direction of an image and to be driven at a high speed in the lateral direction. Actually, the drive in the longitudinal direction is done at such a speed, e.g. 60 Hz, that the eyes cannot feel flickers, while the drive in the lateral direction is done faster concurrently. A longitudinal to lateral ratio of drive frequency corresponds to a resolution in the longitudinal direction. For example, in order to obtain the XGA resolution (1024×768), given that the longitudinal scanning region is fully used, the frequency is determined as 60×768=46 KHz, where because the picture is depicted by reciprocative scanning in the lateral direction, half of the frequency, i.e. 23 KHz, is required. This result is a very high speed as a mirror scanning velocity.

Use of resonant drive is preferable to obtain a large mechanical amplitude at high speed. Without using resonant drive, conversely, amplitude or speed would be insufficient. Thus, the H-direction drive is implemented, preferably, by sinusoidal drive.

The V-direction scanning only involves a cycle as much as 60 Hz so that the scanning velocity is relatively low, permitting the use of a drive method which does not use resonance. For the V-direction drive, given a screen switching cycle of 60 Hz, the requirement is 60 Hz for sawtooth drive or 30 Hz for triangular drive with the use of reciprocation.

Consideration is given to velocity uniformity on a scanning surface in the H direction, in which sinusoidal drive is applied. Since resonance is used in the H direction, there inevitably occurs a velocity difference between the center and the peripheries. Since the velocity is zero in the outermost periphery, it is hard to use the full area. For example, 75% of the scanning time from a maximum peak to a minimum peak of the sine wave is used as an effective scanning area. That is, in consideration of sinusoidal drive, where Sin(90×0.75)= 0.92, the effective scanning area of 75% corresponds to 92% of the effective scanning angle. In this case, a ratio of the scanning velocity in the outermost periphery of the effective area to that of the center can be calculated using cosine, where Cos(90×0.75)=0.38, i.e., 38%. As far as sinusoidal drive is used, mechanical compensation of the resultant value can hardly be achieved.

In the case where image compensation is performed without any optical compensation, it could be conceived to change a clock frequency corresponding to 1 dot between the peripheries and the center. For an about 40% clock difference, one possible way is that 1 dot is divided into 10 clocks, for example, so that 1 dot is represented by 10 clocks in the peripheries while 1 dot is represented by 4 clocks in the center. However, because of the XGA resolution of 60 Hz, there arises a need for a laser modulation frequency of 60×1024×768×10 clocks=470 MHz. This corresponds to an output of an about 2 ns pulse light per clock, involving an expensive laser that can follow high-speed modulation. Moreover, image processing circuits have limitations in fulfilling high-speed processing. For example, an FPGA circuit, now regarded as a high-speed circuit, can operate at about 10 GHz, whereas representation of the XGA resolution at 60 Hz with 256 grey scales involves about 12 GHz. Although technological advancement may enhance the speed of the circuit, undesirably, the image processing circuit also becomes even more expensive. Besides, even if image processing is fulfilled, nonuniformities in brightness due to velocity differences cannot be compensated, in which case uniform brightness is obtained by lowering the luminous intensity (laser intensity) in the peripheries, thereby undesirably darkening the whole image.

Therefore, it is most preferable to maintain the velocity uniformity in the H direction by means of an optical system, which preferably has a so-called f-arcsine θ characteristic for the velocity uniformity. Besides, since the f-arcsine θ characteristic is needed for the velocity uniformity in the H direction, an f-θ or f-Tanθ characteristic will do for the V direction that is the vertical direction, meaning that the projection optical system has different characteristics between the H direction and the V direction.

In the projection optical system, which usually projects rays of light derived from three RGB light sources for colorful display, occurrence of a chromatic aberration (magnification and axial) causes color bleeding, resulting in deterioration of the image performance. Accordingly, the optical system needs to be reduced in chromatic aberration. In particular, the f-arcsine θ characteristic, which largely deflects the rays of light in the peripheries of the H direction, is undesirable because using a refractive lens to make up the projection optical system would cause a large chromatic aberration to occur, making it difficult to fulfill compensation. Accordingly, it is preferable to make up the projection optical system by using a reflecting optical system free from occurrence of any chromatic aberration. It is noted that without being limited to reflecting optical systems alone, a non-power transmitting lens which causes less occurrence of chromatic aberrations may be placed in the optical path to fulfill residual aberration or the like. This concept is not excluded for the invention.

The requirement for the projection optical system is to successfully compensate both velocity uniformity and imaging performance over the entire image area. For satisfaction of two constraints, at least two reflecting mirrors are necessary for the projection optical system. Therefore, it is preferable that the projection optical system has at least two reflecting mirrors.

In the reflecting optical system, the optical system (scanning mirrors) needs to be arranged to fulfill separation of rays of light, where the separation of rays of light is preferably directed along the V direction. As ordinary display screens are oblong ones having an aspect ratio of 4:3 or 16:9, the separation is easier to do with shorter sides, preferably allowing the whole reflecting optical system to be small-sized. Also, in ordinary projectors or projection devices can project an image from the lower front toward a projection surface, such as screen, the separation in the V direction makes it easier to do oblique projection from below.

Further, a reflecting optical system using free-form surfaces needs to be provided with the arcsine characteristic particularly in the H direction alone.

The reflecting optical system needs to be arranged to implement the separation of rays of light as shown above. Since the scanning device performs two-dimensional scanning of light from the light source, the width of the whole light beam tend to increase with increasing distance from the scanning device. Accordingly, for example, the projection optical system in the embodiment of Patent Document 2 would be large-sized as a whole. In order to achieve a small-sized projection optical system with the use of a reflecting optical system, it is preferable for the projection optical system to have a light source image in its optical path. With a light source image present in the optical path, the light beam becomes smaller at the site of the light source image, so that the above-described problem that the light beam becomes increasingly larger with increasing distance from the scanning device can be solved and the light beam departing from the light source image can be reduced in size (i.e., the size of optical elements).

In this case, the light source image is preferably present between the first and the second reflecting surfaces of the reflecting optical system, counting from the scanning device. Further, even with an optical system that creates a light source image in the optical path, if the light source image is formed away from the scanning device, the light beam preceding the light source image would be spread, undesirably resulting in increases in size of the optical elements and the projection optical system. Conversely, when the light source image is present between the first and the second reflecting surfaces, more preferably, the smallest size of the reflecting optical system can be achieved.

In order to prevent occurrence of chromatic aberration, reflecting surfaces are preferably employed. Since a scanning optical system including a MEMS mirror has two degrees of freedom for velocity uniformity and focusing, the system requires at least two reflecting surfaces. In addition, oblique projection also requires a free-form surface mirror to suitably compensate aberration. Also, the light source image is preferably present between the first and the second reflecting surfaces to downsize the two reflecting surfaces.

Further, by projecting (re-focusing) the light source image on the scanning surface using a reflecting surface following the second reflecting surface, a successful projection image can be obtained on the scanning surface.

With the above construction, the optical system can be down-sized, whereas it is necessary to satisfy the f-arcsine θ characteristic in the H direction in order to obtain successful projection performance. For this purpose, preferably, the reflecting surface is so formed as to become increasingly intense in convex power, i.e. positive power, with getting closer to the peripheries of the H direction.

Figure 14:
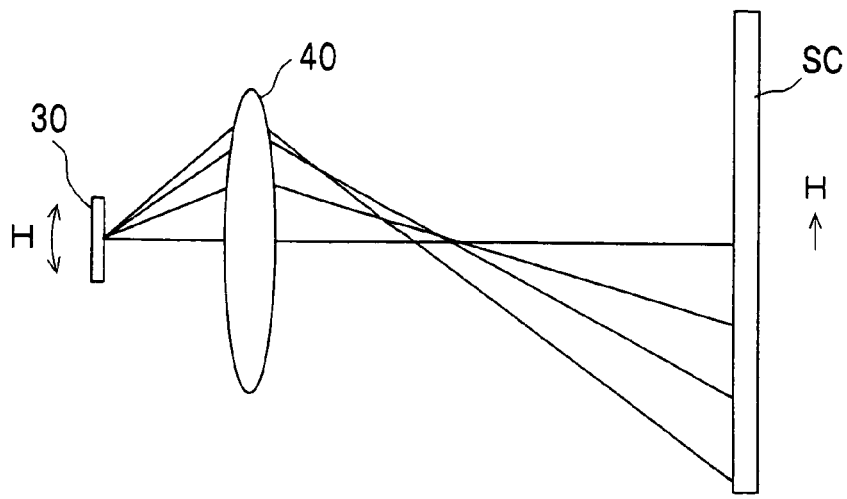
FIG. 14 is an explanatory view of a projection optical system according to the invention.

The above reason is explained with reference to FIG. 14. FIG. 14 schematically shows an optical path diagram along an H-direction cross section, from a scanning device 30 to a scanning surface (screen SC). Both the scanning device 30 and a projection optical system 40 are actually reflecting optical systems, but shown as transmitting optical systems in FIG. 14 for easy understanding.

In the case where the positive power in the peripheries of the H direction of the projection optical system 40 becomes larger, as shown in FIG. 14, a ray of light which is closer to peripheral portions in the projection optical system will be more deflected. As a result, because of sinusoidal drive in the H direction, the deflection angle caused by the scanning device 30 is temporally unequal in intervals, but equalized in intervals (uniform-velocity scanning) on the scanning surface by the projection optical system 40.

Therefore, the projection optical system 40 preferably has a reflecting surface having the characteristic that the positive power in the peripheries of the H direction becomes larger. Further, the projection optical system 40 preferably has the aforementioned characteristic in the first mirror; otherwise, the reflecting surface having the largest effective area in the H direction in the projection optical system exhibits the aforementioned characteristic.

Whereas the peripheries of the H direction are given larger convex power to obtain the arcsine characteristic, separated rays of light makes it better control of the deflection angle of rays independently. From this point of view, when the surface having the highest degree of separation of rays of light exhibits the aforementioned characteristic, the arcsine characteristic can be provided efficiently.

Furthermore, when all the reflecting mirrors have the aforementioned characteristic so as to share the effects of the arcsine characteristic thereamong, preferably, aberration compensation and velocity uniformity can be maintained well-balanced.

Next, with respect to the light source image present between the first mirror and the second mirror in the projection optical system, preferably, the first mirror satisfies the following conditional equation (1) in view of the projection performance, size reduction of the projection optical system:

$$0 < (S1H \times f1H)/(S1H + f1H)/L12 < 1.0 \ldots \quad (1)$$

where L12 represents an optical path length of an optical-axis principal ray between the first mirror and the second mirror, f1H represents an focal length of the first mirror in the vicinity of the optical-axis principal ray, as measured in the H direction, and S1H represents an object distance of the light source image formed by the incident optical system from the first mirror, as measured in the H direction. It is noted here that the term "optical-axis principal ray" refers to a ray which is emitted from the light source and passes through the center of the pupil, out of light rays directed toward the center of the screen display area on the scanning surface (rays in a state that the scanning angle of the deflection scanning means is zero).

The conditional equation (1) is a relational expression that properly determines the distance between mirrors, the focal length of the first mirror in the H direction, and the object of the light source in the H direction relative to the first mirror. With this relational expression satisfied, the light source image in the H direction is formed intermediately between the first mirror and the second mirror.

Conversely, with the upper limit of the relational expression surpassed or with its lower limit unreached, the light source image in the H direction is not formed intermediately between the first mirror and the second mirror, disabling re-focusing.

Further, the first mirror preferably satisfies the following conditional equation (1a):

$$0.2 < (S1H \times f1H)/(S1H + f1H)/L12 < 0.6 \ldots \quad (1a)$$

With this equation (1a) satisfied, aberrations and optical element size are best-balanced, achieving a preferable arrangement. More specifically, the light source image in the H direction is preferably present near a middle between the first mirror and the second mirror or at a position somewhat closer to the first mirror than the middle, achieving the best arrangement.

With the upper limit of the conditional equation (1a) surpassed, the focal length of the first mirror becomes too long, making it difficult to place the light source image between the first mirror and the second mirror.

Conversely, with the lower limit of the relational expression (1a) unreached, the light source image is formed at a proximity to the first mirror, in which case the power of the first mirror becomes too strong, making it difficult to suppress various aberrations caused by the first mirror, with a result that a successful image can no longer be obtained, or in which case the distance between the light source image and the second mirror is lengthened, causing optical elements following the second mirror to be increased in size, with a desirable result that a small-sized projection optical system is difficult to obtain.

Further, the projection optical system according to the present invention is preferably composed of only two mirrors. The projection optical system according to the invention requires at least two mirrors, i.e., the first mirror having the function of creating a light source image in the optical path and the optical system for re-focusing the intermediate light source image on a scanning surface, such as screen. However, since the two-mirror composition includes least components in quantity, hence, preferably reducing cost and downsizing. Furthermore, the two mirrors, each having a positive power, preferably satisfy the following conditional equation (2):

$$0<(S1V\times f1V)/(S1V+f1V)/L12<1.0\ldots \qquad (2)$$

where L12 represents an optical path length of an optical-axis principal ray between the first mirror and the second mirror, f1V represents a focal length of the first mirror in the vicinity of the optical-axis principal ray, as measured in the V direction, and S1V represents an object distance of the light source image formed by the incident optical system from the first mirror, as measured in the V direction.

The conditional equation (2) is a relational expression that properly determines the distance between mirrors, the focal length of the first mirror in the V direction, and the object of the light source in the V direction relative to the first mirror. With this relational expression satisfied, the light source image in the V direction is formed intermediately between the first mirror and the second mirror.

Conversely, with the upper limit of the relational expression surpassed or with its lower limit unreached, the light source image in the V direction is not formed intermediately between the first mirror and the second mirror, disabling re-focusing.

Further, the first mirror preferably satisfies the following conditional equation (2a):

$$0.4<(S1H\times f1H)/(S1H+f1H)/L12<0.8\ldots \qquad (2a)$$

With this equation expression (2a) satisfied, aberrations and optical element size are best-balanced, achieving a preferable arrangement. More specifically, the light source image in the V direction is preferably present near a middle between the first mirror and the second mirror or at a position somewhat closer to the first mirror than the middle, achieving the best arrangement.

With the upper limit of the conditional equation (2a) surpassed, the focal length of the first mirror becomes too long, making it difficult to place the light source image between the first mirror and the second mirror.

Conversely, with the lower limit of the relational expression (2a) unreached, the light source image is formed at a proximity to the first mirror, in which case the power of the first mirror becomes too strong, making it difficult to suppress various aberrations caused by the first mirror, with a result that a successful image can no longer be obtained, or in which case the distance between the light source image and the second mirror is lengthened, causing optical elements following the second mirror to be increased in size, with a desirable result that a small-sized projection optical system is difficult to obtain.

Further, with respect to the incident light onto the first mirror, preferably, the light source image in the H direction is formed at a positive position relative to the first mirror while the light source image in the V direction is formed at a negative position relative to the first mirror. This means that the first mirror receives convergent light incident for the H direction and divergent light incident for the V direction. In order to that the projection optical system, while keeping the arcsine characteristic, successfully compensates for its curvature of field, convergent light is preferably incident for the H direction. For the V direction, a common projection method is applied, hence, divergent light is preferably incident.

In this case, in order to create both an H-direction light source image and a V-direction light source image at the middle between the first mirror and the second mirror in the above-described state, it is preferable that the H-direction power and the V-direction power of the first mirror satisfy the following conditional equation (3):

$$0<f1V/f1H<1\ldots \qquad (3)$$

That is, it is preferable that the V-direction power of the first mirror is greater than the H-direction power thereof. Since the light source image can be formed between the first mirror and the second mirror under a condition of incident light that is successful for aberration compensation, the conditional equation (3) can be regarded as an especially preferable relationship.

Further, more preferably, the H-direction power and the V-direction power of the first mirror satisfy the following conditional equation (3a). The reason is that while a proper difference in power is maintained between the H-direction power and the V-direction power, no extreme anamorphic ratio does not result.

$$0.1<f1V/f1H<0.7\ldots \qquad (3a)$$

Next, with respect to the incident optical system, since proper characteristics of the projection optical system differ between the H direction and the V direction as described above, giving incidence of light beams having characteristics suited to the individual directions, respectively, makes clear the roles of surface configurations in the individual directions, allowing an easier ensuring of characteristics.

Also, since giving the degree of freedom to the incident optical system allows the characteristics to be ensured with the incident optical system plus the projection optical system, it becomes possible to reduce the number of optical surfaces included in the projection optical system, as compared with conventional cases using the projection optical system alone, so that the optical system can be prevented from increasing in scale.

For fulfilment of light beams that differ from one another depending on the direction, the incident optical system is preferably provided as an optical system that differs in power between the H direction and the V direction. Means for fulfilling such an optical system with a single surface are exemplified by the use of an anamorphic surface, a biconic surface, a free-form surface and the like.

In the present invention, for improved velocity uniformity performance in the H direction, a surface exhibiting intense positive power in its peripheries is used in the projection optical system to obtain the arcsine characteristic in the H direction as described above. However, the power characteristic may cause the peripheries of the image surface to be negatively tilted at a light source image position, incurring deterioration of the image performance.

Figure 15A:
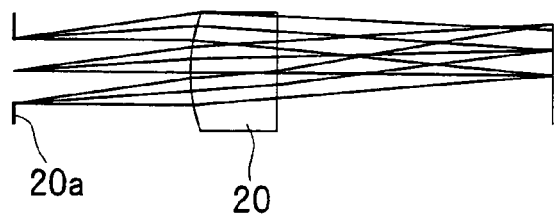
FIGS. 15A and 15B show explanatory views of a state of the image surface with incidence of collimated light.
Figure 15B:
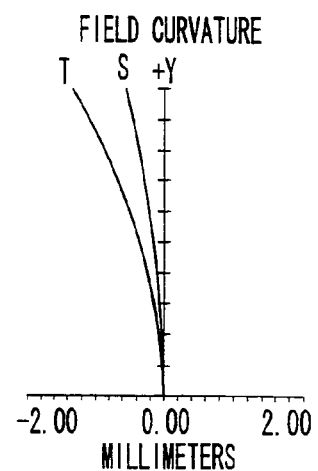
Figure 16A:
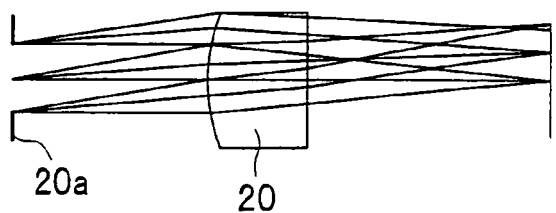
FIGS. 16A and 16B show explanatory views of a state of the image surface with incidence of convergent light.

For solution to this problem, it is preferable that, for the H direction, the scanning device is supplied with convergent light. The reason is explained with reference to FIGS. 15 and 16. FIG. 15A shows a state of an optical system 20 and the image surface resulting upon incidence of a light beam having an infinite object distance (collimated light), FIG. 15B is a graph showing curvature of field of a sagittal surface (S) and a tangential surface (T) in FIG. 15A. Also, FIG. 16 shows a state of the optical system 20 and the image surface resulting upon incidence of convergent light, and FIG. 16B is a graph showing curvature of field of a sagittal surface (S) and a tangential surface (T) in FIG. 16A.

Figure 16B:
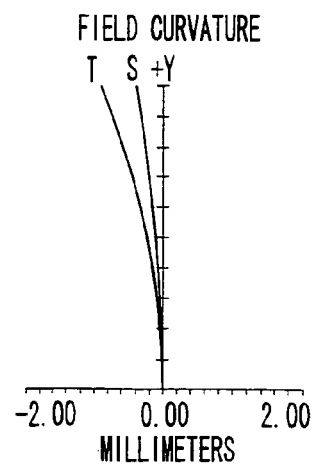

As can be seen from comparison between FIGS. 15B and 16B, although a tilt toward the negative side has occurred in either case, the tilt of the image surface can be improved by supplying the optical system 20 with convergent light.

Accordingly, by supplying the scanning device with convergent light for the H direction according to the invention, a projection apparatus with successful performance can be provided.

In this case, given an H-direction object distance Sh which ranges to the H-direction light source image formed by the incident optical system with respect to the position of the scanning device, and given a pupil diameter d, it is preferable that the incident optical system 20 satisfies the following equation (11):

$$20 < Sh/d < 80 \ldots \tag{11}$$

If Sh/d is larger than 80 (i.e., the object position is too far from the incident optical system), then the degree of convergence of the light beam becomes too smaller, making it difficult to obtain enough image-surface compensation effect for the light source image.

Also, if Sh/d is smaller than 20 (i.e., the object position is too close to the incident optical system), then the light beam is diverged by the optical system preceding the light source image, hence contradicting the aim of size reduction of the optical system.

With respect to the V direction as well, given a V-direction object distance Sv which ranges to the V-direction light source image formed by the incident optical system with respect to the position of the scanning device, and given a pupil diameter d, it is preferable that the incident optical system 20 satisfies the following equation (12):

$$|0.05| > d/Sv \ldots \tag{12}$$

In a case where intensely convergent light is supplied for the V direction, the power of the optical system preceding the light source image becomes very small, while the optical system following the light source image, conversely, requires the power for imaging on the screen, so that the power balance between the optical systems preceding and following the light source image is biased, causing the aberration balance to be also biased, with the result that a successful image cannot be obtained.

In another case where intensely divergent light is supplied for the V direction, the optical system preceding the light source image requires a larger power for forming the light source image, so that the power balance between the optical systems preceding and following the light source image is biased as in the foregoing case, causing the aberration balance to be also biased, with the result that a successful image cannot be obtained.

Consequently, for the V direction, it is necessary to supply collimated light, or slightly convergent or divergent light.

Further, the optical system following the light source image emits slightly convergent light to form the image on the screen, and therefore it is preferable that slightly divergent light is supplied to the optical system preceding the light source image in terms of symmetry between the optical systems preceding and following the light source image. More specifically, it is preferable that the following conditional equation (12a) is satisfied;

$$-0.05 < d/Sv < 0 \ldots \tag{12a}$$

When this conditional equation (12a) is satisfied, then a symmetrical optical system advantageous to aberration compensation is realized, preferably obtaining a successful image.

Further, it is preferable that a ratio of the H-direction power to V-direction power of the incident optical system satisfies the following equation (13):

$$1.2 < PwH/PwV < 7.0 \ldots \tag{13}$$

where PwH represents an absolute value of H-direction power of the incident optical system, and PwV represents an absolute value of V-direction power of the incident optical system.

If the power ratio is not more than 1.2, i.e., the power difference between the H direction and the V direction is small, then ensuring the performance in the H direction involves intensely convergent light also in the V direction, which is undesirable because a successful image cannot be obtained in terms of the power balance of the optical system as described by the foregoing equation (12).

Conversely, ensuring the performance in the V direction involves lacking the degree of convergence in the H direction, because slightly convergent or divergent light is preferable for the V direction as described by the foregoing equation (12), thus making it impossible to achieve image surface compensation enough for the light source image.

If the power ratio is not less than 7.0, i.e., the power difference between the H direction and the V direction is large, then the geometric difference of the projection optical system between the H direction and the V direction becomes larger, so that even with the use of free-form surfaces having high degrees of geometric freedom, the degree of freedom of surface geometry is utilized for the ensuring of distortion and velocity uniformity, thus resulting in a difficulty in obtaining successful images at four corners of the screen.

With the use of the projection apparatus having the above-described features, there can be provided an image output apparatus of high grade and small size.

Next, specific configurations according to the present invention is explained below.

First Embodiment

Figure 1B:
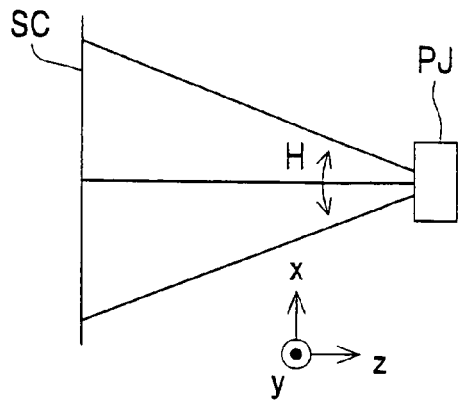

FIGS. 1A and 1B are overall views showing a first embodiment of the present invention, where FIG. 1A is a side view thereof and FIG. 1B is a plan view thereof. A laser projection apparatus PJ projects a light beam, subjected to intensity modulation based on an image signal, scanning in the V (Vertical) direction and the H (Horizontal) direction to form a raster scan image on a screen SC. As shown in FIG. 1A, projection to the screen SC from an oblique down side allows the laser projection apparatus PJ to be kept out of the field of view of a viewer.

Figure 2:
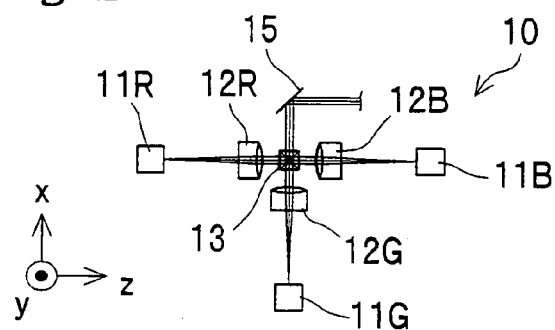
FIG. 2 is a configurational view showing an example of a light source unit in a laser projection apparatus PJ.

FIG. 2 is a configurational view showing an example of a light source unit in the laser projection apparatus PJ. The light source unit 10 includes a laser device 11R for generating R (Red) light, a laser device 11G for generating G (Green) light, a laser device 11B for generating B (Blue) light, an incident optical system 12R for supplying the R light derived from the laser device 11R to a scanning device so that an optimum object distance to the projection optical system is obtained, an incident optical system 12G for supplying the G light derived from the laser device 11G to the scanning device so that an optimum object distance to the projection optical system is obtained, an incident optical system 12B for supplying the B light derived from the laser device 11B to the scanning device so that an optimum object distance to the projection optical system is obtained, a color synthesizing device 13 for coaxially synthesizing R light, G light and B light together, and a folding mirror 15. The color synthesizing device 13 may be composed of, for example, a combination of prisms or dichroic mirrors.

The laser device 11R may be, for example, a semiconductor laser which generates light having a wavelength of 630 nm. The laser device 11G may be, for example, a semiconductor laser-excited solid state laser which generates light having a wavelength of 532 nm with second harmonic generation implemented by a PPLN waveguide. The laser device 11B may be, for example, a semiconductor laser which generates light having a wavelength of 445 nm. Given that maximum output powers of R light, G light and B light are 150 mW, 120 mW and 83 mW, respectively, or that such a ratio of their maximum output powers as determined by these values is set, a vivid screen of clear white and broad color reproducibility can be obtained. For instance, in the case where an output value from the light source unit 10 is about 100 lm (lumen), with a total loss of 50% due to the optical systems (including surface reflection loss, loss due to MEMS time control, loss due to color synthesizing device, etc), a brightness of about 50 μm can be obtained on the screen SC.

The laser devices 11R, 11B may be designed so as to directly modulate injection currents to the laser chip, or otherwise optical modulators such as AO (Acousto-Optic) devices may be provided separately. The laser device 11G may be designed so as to directly modulate an injection current to the excitation laser chip, or otherwise an optical modulator such as an AO (Acousto-Optic) device may be provided separately.

Figure 3A:
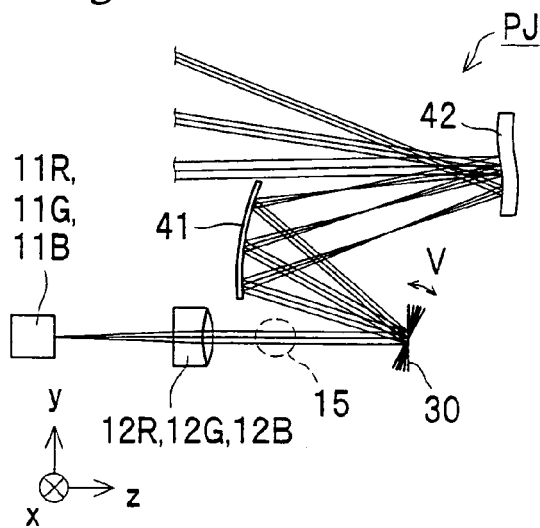
FIGS. 3A and 3B show the configuration of the laser projection apparatus PJ according to the first embodiment, where
Figure 3B:
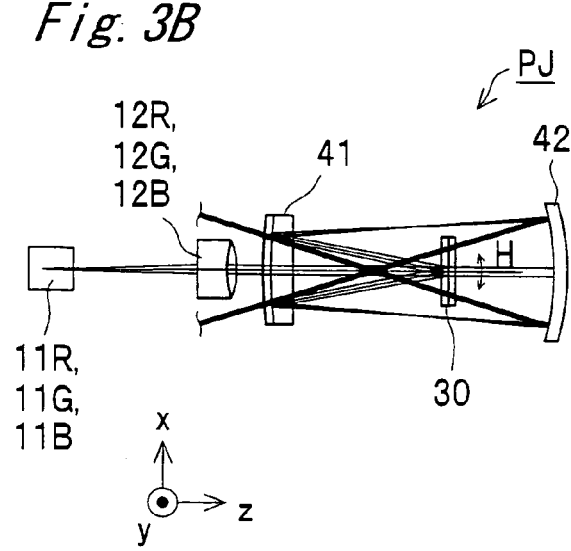

FIGS. 3A and 3B show the configuration of the laser projection apparatus PJ according to the first embodiment, where FIG. 3A is a side view thereof and FIG. 3B is a plan view thereof. The laser projection apparatus PJ includes the above-described light source unit 10, the scanning device 30 for two-dimensionally scanning the light beam derived from the light source unit 10, a projection optical system for projecting the light beam derived from the scanning device 30 to the screen.

The light source unit 10 is positioned off the folding mirror 15 in a direction vertical to the drawing sheet. In FIGS. 3A and 3B, the folding mirror 15 is omitted in the illustration for easier understanding.

Each of the incident optical systems 12R, 12G, 12B includes an optical lens which has a flat surface on its light source side and an anamorphic surface differing in radius of curvature between H and V directions on its exit side, where the H-direction power and the V-direction power are different from each other.

Figure 4:
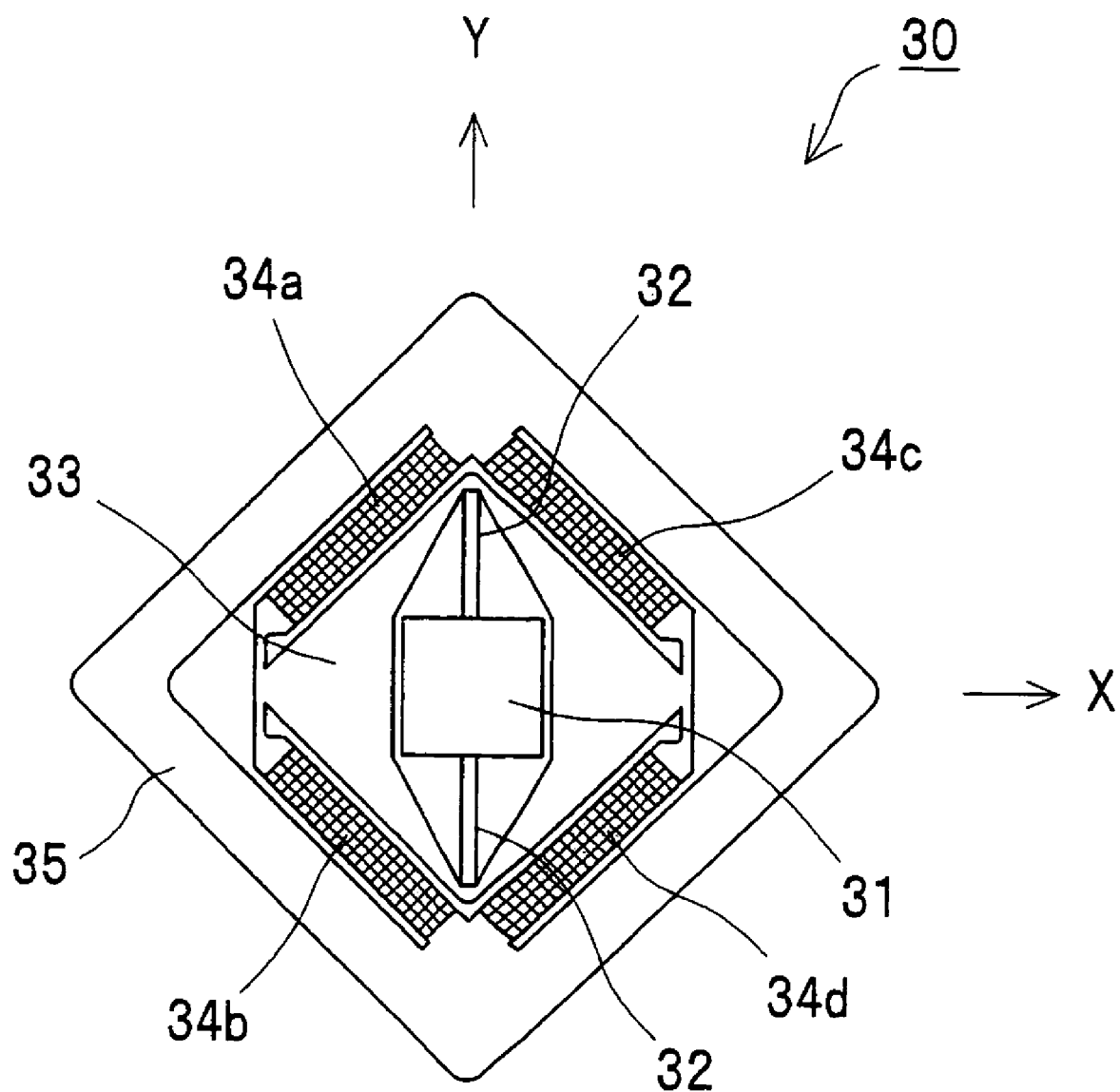
FIG. 4 is a front view showing an illustrative construction of a scanning device 30.

The scanning device 30 includes a MEMS mirror as shown in FIG. 4. Deflection in the H direction is performed by resonant drive while deflection in the V direction is performed by non-resonant drive.

The projection optical system is composed of two nonaxisymmetric-shaped reflecting mirrors 41, 42. In this embodiment, as shown in FIG. 3A, a light source image is present between the first mirror 41, which is the closest to the scanning device 30, and the second mirror 42.

FIG. 4 is a front view showing an illustrative construction of the scanning device 30. A scanning mirror 31 is supported by a pair of torsion bars 32, which extends toward both sides along the y direction, so as to be angularly displaceable about the Y axis with a specified elastic modulus in torsion. The root of each torsion bar 32 is fixed to a movable frame 33. The movable frame 33 is supported so as to be angularly displaceable about the X axis with respect to a fixing frame 35. These scanning mirror 31, torsion bars 32, movable frame 33 and fixing frame 35 can be formed integrally by microfabrication of a silicon substrate. The scanning mirror 31 is so formed that a metal thin film or other optical reflection film is deposited on the surface of the silicon substrate. The effective diameter (pupil diameter) of the scanning mirror 31 is designed at, for example, φ1 mm.

Piezoelectric devices 34a to 34d which can be deformed in response to applied voltages are fixed at individual opposite sides of the square-shaped movable frame 33 and fixing frame 35, respectively. For example, in a case where a positive voltage is applied to the piezoelectric devices 34a, 34c while a negative voltage is applied to the piezoelectric devices 34b, 34d, and where the piezoelectric devices are alternately driven with the positive and negative voltages, the scanning mirror 31 is angularly displaced about the X axis.

In another case where a positive voltage is applied to the piezoelectric devices 34a, 34b while a negative voltage is applied to the piezoelectric devices 34c, 34d, and where the piezoelectric devices are alternately driven with the positive and negative voltages, the scanning mirror 31 is angularly displaced about the Y axis. In this case, the scanning mirror 31 is reciprocatively oscillated at an resonance frequency determined by the elastic modulus in torsion of the torsion bars 32 and the effective mass of the scanning mirror 31, where the angle of the scanning mirror 31 varies in a sinusoidal function with time.

When a voltage in which an H-direction drive signal and a V-direction drive signal have been superimposed is applied to the four piezoelectric devices 34a to 34d, it becomes possible to fulfill the resonant drive in the H direction on the inner torsion bar 32 serving as a supporting point as well as the V-direction drive for driving the whole outer movable frame 33.

By using such a MEMS mirror, two-dimensional scanning can be carried out by a single scanning device, so that a reduction of parts count as well as reductions in assembly and apparatuses costs can be achieved.

Next, the projection optical system is explained. Each of the reflecting mirrors 41, 42 includes a free-form surface mirror, each of which is represented by an XY polynomial using a local coordinate system (X, Y, Z) taking a surface vertex as the origin, where both mirrors have a positive power. As shown in FIG. 3A, it can be understood that the light source image is present intermediate between the first mirror 41 and the second mirror 42, and that the pupil image (MEMS image) is formed after the second mirror 42.

In the first embodiment, separation of rays of light is applied for the V direction. Relative to the oblong display screen, the V direction corresponds to the direction of the shorter side of the image, in which case the space for the separation of rays of light becomes smaller, compared with separation in the longer side direction, allowing the whole projection optical system to be downsized. Further, since the projection optical system is so arranged as to be right-and-left symmetrical in the H direction with respect to an X=0 cross section, the scanning mirror becomes right-and-left symmetrical. This right-and-left symmetrical configuration leads to relative easiness of manufacture and evaluation.

A specific Numerical Value Example 1 of the first embodiment is shown below (Tables 1A to 1D). In Table 1A, with exit positions of the individual laser devices 11R, 11G, 11B defined as objects, with respect to a lens input surface of the optical system 20, a lens output surface, a pupil just before the scanning device 30, the scanning device 30, and optical surfaces of the first mirror 41, the second mirror 42 and the screen SC in the projection optical system in order from the objects, surface type, Y-direction radius of curvature (mm), Y-direction conic constant, material, X-direction radius of curvature (mm), and X-direction conic constant are shown, respectively.

In Table 1B, surface vertex coordinates of individual optical surfaces by referencing the pupil are shown by a global coordinate system (x, y, z), and moreover, tilt angles (in degrees) with respect to the X axis of the local coordinate system are shown for the optical surfaces, respectively.

Table 1C shows free-form surface data of the first mirror 41 and the second mirror 42. A free-form surface can be expressed by the following equation using the local coordinate system (X, Y, Z) taking a surface vertex as the origin:

$$Z = (C_0 \cdot H^2)/[1+\sqrt{\{1-(1+K)C_0^2 H^2\}}] + \Sigma\{A_{jk} \cdot X^j Y^k\}$$

where Z represents a replacement quantity in the Z-axis direction at a position of height H (by referencing the surface vertex), H represents a height in a direction vertical to the Z axis ($H^2 = X^2 + Y^2$), $C_0$ represents a radius of curvature at the surface vertex, K represents a conic constant, and $A_{jk}$ represents a free-form surface factor corresponding to a power j of X and a power k of Y. In Table 1C, for example, X2Y0 represents that the X's power j=2 and Y's power k=0, where a factor $A_{jk}$ corresponding to this is $1.685 \times 10^{-2}$. The case is the same also with the other factors.

Table 1D shows scanning angle and time utilization factor of the scanning device 30 with respect to the H direction and the V direction.

TABLE 1A

NUMERICAL VALUE EXAMPLE 1

| Surface | Surface type | Radius of curvature (Y) | Conic const. (Ky) | Material | Radius of curvature (X) | Conic const. (Kx) |
|---|---|---|---|---|---|---|
| Object | Standard | Infinite | | | | |
| Lens input | Standard | Infinite | 0 | BK7 | | |
| Lens output | XY curved surface | −6.568495 | 0 | | −4.91047 | 0 |
| (Pupil) | Standard | Infinite | | | | |
| Scan device | Standard | Infinite | | Mirror | | |
| First mirror | Free-form surface | Infinite | 0 | Mirror | Infinite | 0 |
| Second mirror | Free-form surface | Infinite | 0 | Mirror | Infinite | 0 |
| Screen | Standard | Infinite | | | | |

TABLE 1B

COORDINATES AND ROTATIONAL ANGLE RELATIVE TO X AXIS OF OPTICAL SURFACES BY REFERENCING PUPIL

| | Surface | | | |
|---|---|---|---|---|
| | x | y | z | Tilt |
| Object | 0 | 0 | −28 | 0 |
| Lens input | 0 | 0 | −18 | 0 |
| Lens output | 0 | 0 | −15 | 0 |
| (Pupil) | 0 | 0 | 0 | 0 |
| Scan device | 0 | 0 | 0 | −15 |
| First mirror | 0 | 6.532 | −12.582 | 0 |
| Second mirror | 0 | 2.217 | −4.17 | 0 |
| Screen | 0 | 81.968 | −434.315 | 19.058 |

TABLE 1C

FREE-FORM SURFACE

| | Factor | | | | | |
|---|---|---|---|---|---|---|
| | X2Y0: | X0Y2: | X0Y3: | X4Y0: | X2Y2: | X0Y4: |
| First mirror | 1.685E−02 | −5.084E−02 | 1.394E−02 | −2.240E−04 | −1.490E−04 | −1.500E−03 |

| | Factor | | | | | |
|---|---|---|---|---|---|---|
| | X2Y3: | X0Y5: | X6Y0: | X4Y2: | X2Y4: | X0Y6: |
| First mirror | 1.599E−05 | 8.334E−05 | −2.73E−06 | 1.17E−06 | −6.19E−07 | −1.83E−06 |

| | Factor | | | | | |
|---|---|---|---|---|---|---|
| | X2Y0: | X0Y2: | X0Y3: | X4Y0: | X2Y2: | X0Y4: |
| Second mirror | −3.840E−03 | 9.481E−01 | −1.877E−01 | −1.380E−04 | −4.860E−04 | 1.589E−02 |

| | Factor | | | | | |
|---|---|---|---|---|---|---|
| | X2Y3: | X0Y5: | X6Y0: | X4Y2: | X2Y4: | X0Y6: |
| Second mirror | 4.589E−05 | −6.440E−04 | −1.64E−06 | 5.51E−07 | −1.29E−06 | 1.02E−05 |

TABLE 1D

| DEFLECTION SCANNING DEVICE | | | |
|---|---|---|---|
| H-scanning mechanical angle | ±5.73 deg. | H-direction time utilization factor | 75% |
| V-scanning mechanical angle | ±7.50 deg. | V-direction time utilization factor | 80% |

Figure 5A:
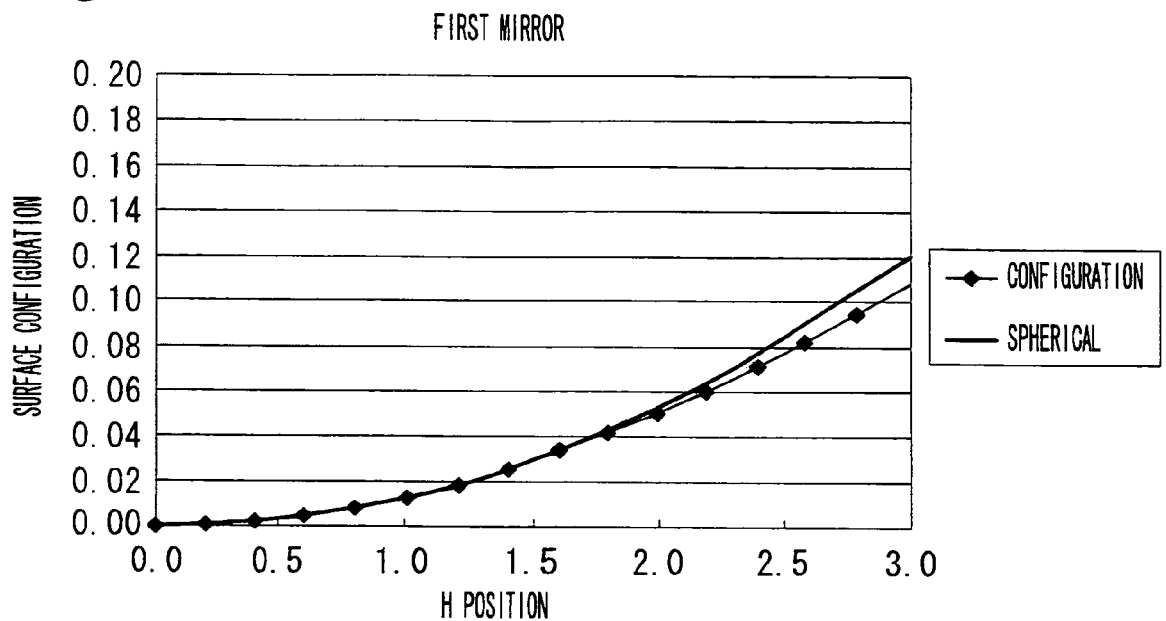
FIG. 5A is a graph showing an H-direction cross-sectional configuration of a first mirror 41.
Figure 5B:
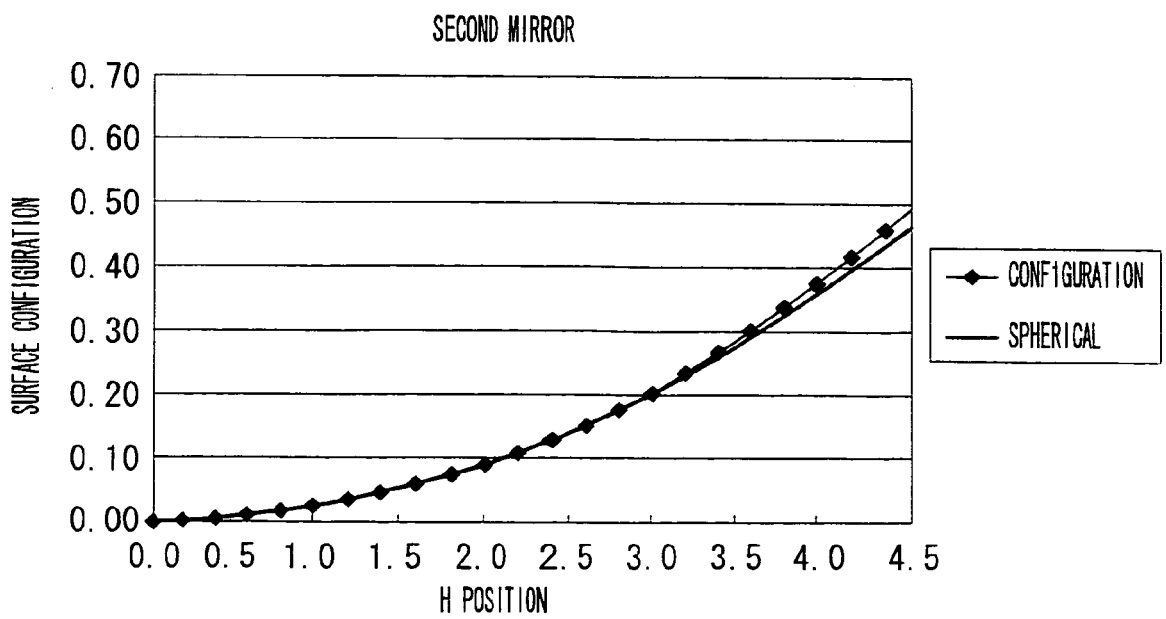
FIG. 5B is a graph showing an H-direction cross-sectional configuration of a second mirror 42.

FIG. 5A is a graph showing an H-direction cross-sectional configuration of the first mirror 41, and FIG. 5B is a graph showing an H-direction cross-sectional configuration of the second mirror 42. The vertical axis represents a normalized distance from a tangential line at a scan center, while the horizontal axis represents a normalized position on which the principal ray impinges. The projection optical system is expressed by synthesization of the power of the first mirror 41 and the power of the second mirror 42.

As seen from FIG. 5A, the H-direction configuration of the first mirror 41 has a smaller curvature, compared with a spherical surface. Meanwhile, as seen in FIG. 5B, the H-direction configuration of the second mirror 42 has a larger curvature, compared with a spherical surface. The synthetic optical system of the two mirrors is so designed as to have an arcsine characteristic and increase in the difference from the spherical surface toward the peripheral portions with the positive power increasing.

In this embodiment, with respect to the focal length of the first mirror 41 and the position of the light source image, an object distance S1H of the light source image formed by the incident optical system from the first mirror 41, as measured in the H direction, is 17.1 mm, an object distance S1V of the light source image formed by the incident optical system from the first mirror 41, as measured in the V direction, is −227.5 mm, an optical path length L12 of the optical-axis principal ray between the first mirror 41 and the second mirror 42 is 21.34 mm, a focal length f1H of the first mirror 41 in the vicinity of the optical-axis principal ray, as measured in the H direction, is 18.74 mm, and a focal length f1V of the first mirror 41 in the vicinity of the optical-axis principal ray, as measured in the V direction, is 11.02 mm.

Accordingly, the value of (S1H×f1H)/(S1H+f1H)/L12 in the foregoing equation (1) is calculated as 0.419, which satisfies the equation (1) and equation (1a).

Also, the value of (S1V×f1V)/(S1V+f1V)/L12 in the equation (2) is calculated as 0.543, which satisfies the equation (2) and the equation (2a).

Also, the value of f1V/f1H in the equation (3) is calculated as 0.588, which satisfies the equation (3) and the equation (3a).

Thus, in the projection optical system according to this embodiment, the light source image in the H direction and the light source image in the V direction are formed intermediate between the first mirror 41 and the second mirror 42, so that the second mirror 42 can be reduced in size.

Next, with respect to the object distance in this embodiment, the pupil diameter d of the laser projection apparatus is ϕ1.0 mm, the distance from the scanning position to the light source image is 31.7 mm in the H direction and −212.9 mm in the V direction. Therefore, the object distance Sh in the H direction is 31.7, which satisfies the conditional equation (11). Also, because the object distance Sv in the V direction is −212.9, the value of 1/Sv becomes −0.0047, which satisfies the conditional equation (13).

Further, the ratio in absolute value of H-direction power to V-direction power of the incident optical system is 1.36, which satisfies the conditional equation (12).

From the above description, any tilt of the image surface of the light source image caused by the projection optical system in this embodiment can be compensated successfully.

Figure 6:
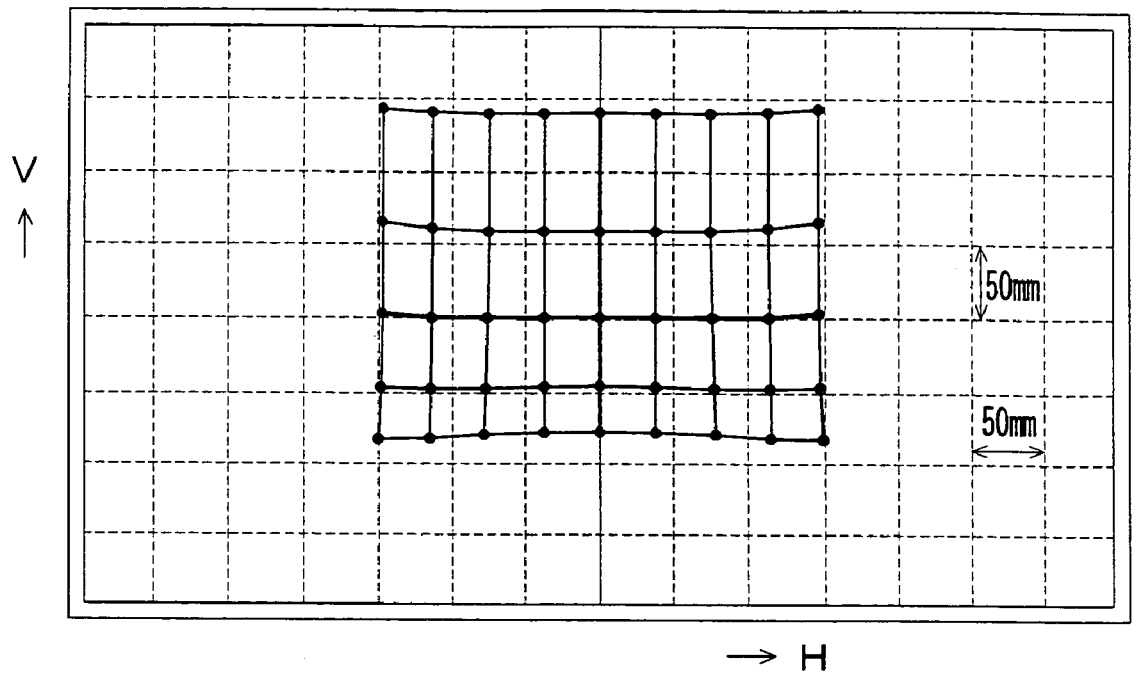
FIG. 6 is a graph showing distortion of the scanning grid on a screen SC.
Figure 7:
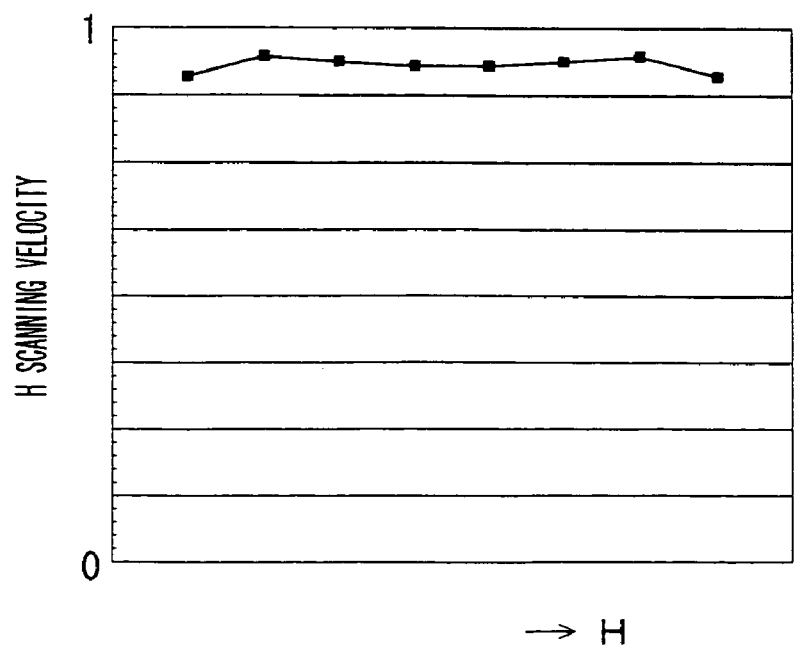
FIG. 7 is a graph showing variations in scanning velocity on the screen SC.

FIG. 6 is a graph showing distortion of the scanning grid on the screen SC. The vertical axis represents a vertical position on the screen SC, while the horizontal axis represents a horizontal position on the screen SC. FIG. 7 is a graph showing variations in scanning velocity on the screen SC. The vertical axis represents the scanning velocity in the H direction on the screen SC, while the horizontal axis represents the horizontal position on the screen SC.

As can be understood from FIGS. 6 and 7, in spite of a very large utilization factor as much as 75% in the H direction, velocity uniformity and distortion are successfully compensated.

In addition, in this embodiment, the grid intervals of horizontal lines in FIG. 6 are not constant, so that velocity uniformity in the V direction is not ensured. However, deflection scanning in the V direction is operated not with linear drive but with such drive as to compensate the velocity uniformity in the V direction, so that a successful image with less distortion can be obtained.

Second Embodiment

Figure 8A:
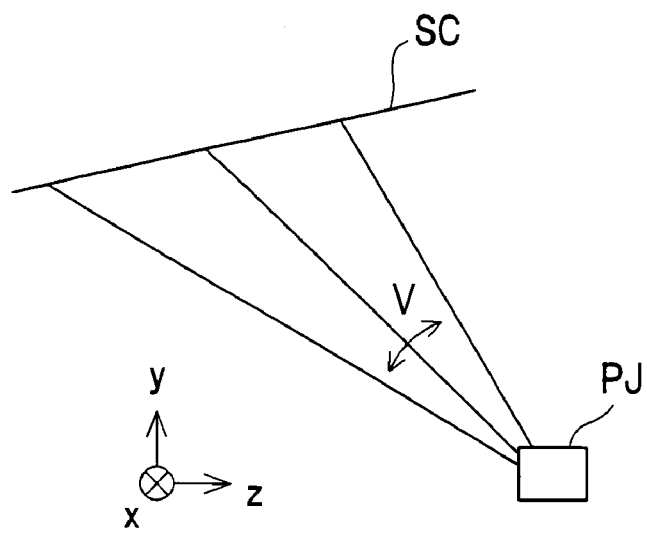
FIGS. 8A and 8B are overall views showing a second embodiment of the invention, where
Figure 8B:
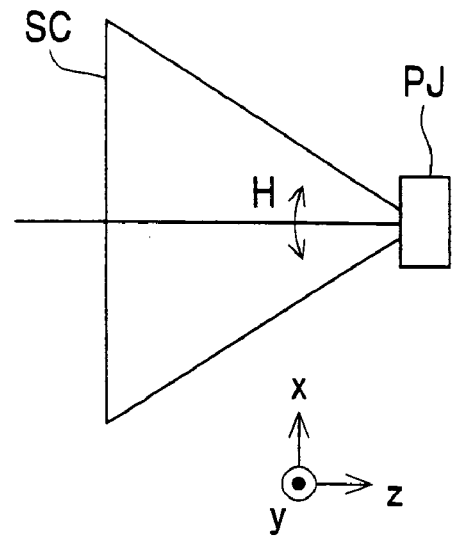

FIGS. 8A and 8B are overall views showing a second embodiment of the invention, where FIG. 8A is a side view thereof and FIG. 8B is a plan view thereof. A laser projection apparatus PJ projects a light beam, subjected to intensity modulation based on an image signal, scanning in the V (Vertical) direction and the H (Horizontal) direction to form a raster scan image on the screen SC. As shown in FIG. 8A, projection to the screen SC from an oblique down side allows the laser projection apparatus PJ to be kept out of the field of view of a viewer.

Figure 9:
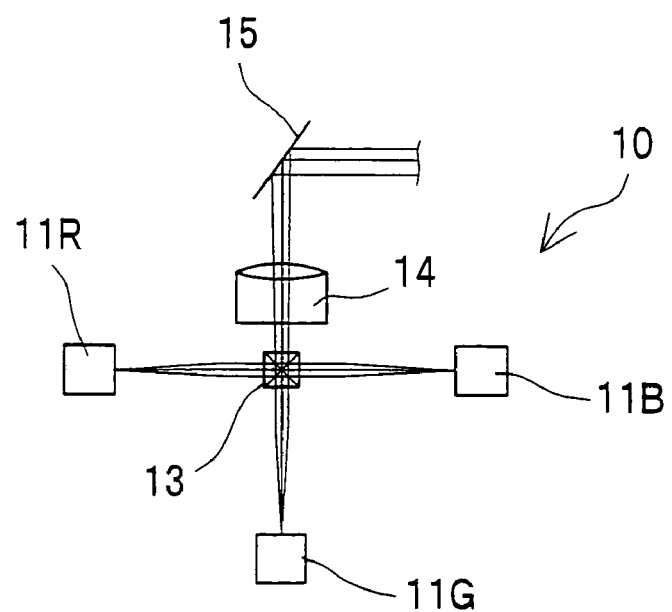
FIG. 9 is a configurational view showing another example of the light source unit in the laser projection apparatus PJ.

FIG. 9 is a configurational view showing another example of the light source unit in the laser projection apparatus PJ. The light source unit 10 includes a laser device 11R for generating R (Red) light, a laser device 11G for generating G (Green) light, a laser device 11B for generating B (Blue) light, a color synthesizing device 13 for coaxially synthesizing R light, G light and B light together, an incident optical system 14 for supplying the R light, G light and B light to a scanning device so that an optimum object distance to the projection optical system is obtained, a folding mirror 15. The color synthesizing device 13 may be composed of, for example, a combination of prisms or dichroic mirrors.

Configuration and operation of the individual laser devices 11R, 11G and 11B are similar to those described by FIG. 2, and their repetitive description is omitted.

Figure 10A:
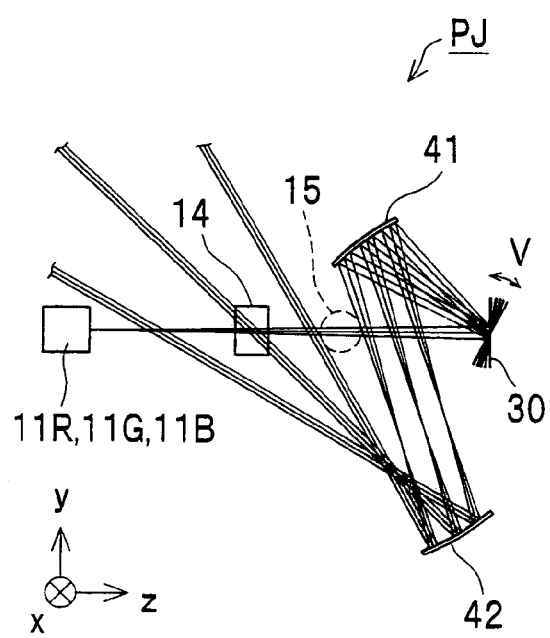
FIGS. 10A and 10B show the configuration of the laser projection apparatus PJ according to the second embodiment, where
Figure 10B:
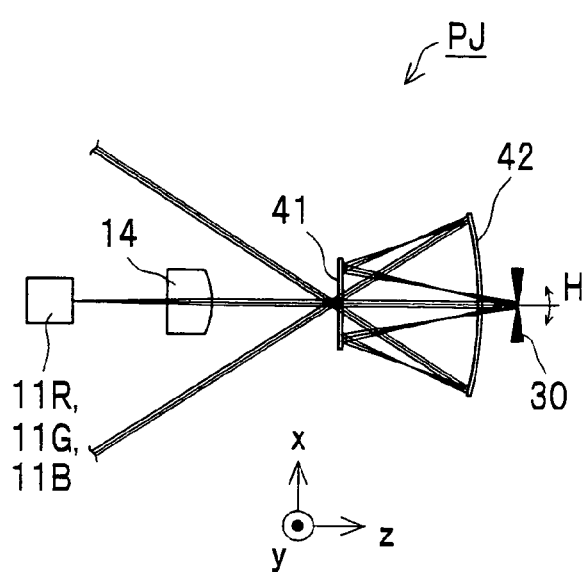

FIGS. 10A and 10B show the configuration of the laser projection apparatus PJ according to the second embodiment, where FIG. 10A is a side view thereof and FIG. 10B is a plan view thereof. The laser projection apparatus PJ includes the aforementioned light source unit 10, the scanning device 30 for two-dimensionally scanning the light beam derived from the light source unit 10, a projection optical system for projecting the light beam derived from the scanning device 30 to the screen.

The light source unit 10 is positioned off the folding mirror 15 in a direction vertical to the drawing sheet. In FIGS. 10A and 10B, the folding mirror 15 is omitted in the illustration for easier understanding.

The incident optical system 14 includes an optical lens which has a flat surface on its light source side and an anamorphic surface differing in radius of curvature between H and V directions on its exit side, where the H-direction power and the V-direction power are different from each other.

The scanning device 30 includes a MEMS mirror as shown in FIG. 4. Deflection in the H direction is performed by resonant drive while deflection in the V direction is performed by non-resonant drive. Configuration and operation of the scanning device 30 are similar to those described by FIG. 4, and their repetitive description is omitted.

The projection optical system is composed of two nonaxisymmetric-shaped reflecting mirrors 41, 42. In this embodiment, as shown in FIG. 10A, a light source image is present between the first mirror 41, which is the closest to the scanning device 30, and the second mirror 42.

Next, the projection optical system is explained. Each of the reflecting mirrors 41, 42 includes a free-form surface mirror, each of which is represented by an XY polynomial using a local coordinate system (X, Y, Z) taking a surface vertex as the origin, where both mirrors have a positive power. As shown in FIG. 10A, it can be understood that the light source image is present intermediate between the first mirror 41 and the second mirror 42, and that the pupil image (MEMS image) is formed after the second mirror 42.

In the second embodiment, separation of rays of light is applied for the V direction. The V direction corresponds to the direction of the shorter side of the oblong display screen, in which case the separation is easier to achieve, compared with separation in the longer side direction, allowing the whole projection optical system to be downsized. Further, since the projection optical system is so arranged as to be right-and-left symmetrical in the H direction with respect to an X=0 cross section, leading to relative easiness of manufacture and evaluation.

In this embodiment, a light beam derived from the light source unit 10 is deflected upward by the scanning device 30, further deflected downward by the first mirror 41, and moreover deflected upward by the second mirror 42, so that light beams intersect one another. Such an arrangement with intersection of light beams as shown above allows two-time use of one identical spatial region, so that a better volumetric efficiency is obtained and a downsizing of the whole apparatus can be achieved.

A concrete Numerical Value Example 2 of the second embodiment is shown below (Tables 2A to 2D). Definitions in Tables 2A to 2D are similar to those of Table 1A to 1D.

TABLE 2A

NUMERICAL VALUE EXAMPLE 2

| Surface | Surface type | Radius of curvature (Y) | Conic const. (Ky) | Material | Radius of curvature (X) | Conic const. (Kx) |
|---|---|---|---|---|---|---|
| Object | Standard | Infinite | | | | |
| Lens input | Standard | Infinite | 0 | BK7 | | |
| Lens output | XY curved surface | −22.40735 | 0 | | −5.1504627 | 0 |
| (Pupil) | Standard | Infinite | | | | |
| Scan device | Standard | Infinite | | Mirror | | |
| First mirror | Free-form surface | Infinite | | Mirror | | |
| Second mirror | Free-form surface | Infinite | 0 | Mirror | | 0 |
| Screen | Standard | Infinite | | | | |

TABLE 2B

COORDINATES AND ROTATIONAL ANGLE RELATIVE TO X AXIS OF OPTICAL SURFACES BY REFERENCING PUPIL

| | Surface | | | |
|---|---|---|---|---|
| | x | y | z | Tilt |
| Object | 0 | 0 | −33 | 0 |
| Lens input | 0 | 0 | −23 | 0 |
| Lens output | 0 | 0 | −20 | 0 |
| (Pupil) | 0 | 0 | 0 | 0 |
| Scan device | 0 | 0 | 0 | −18 |
| First mirror | 0 | 10.926 | −6.647 | −65.602 |
| Second mirror | 0 | −15.383 | 0.829 | −44 |
| Screen | 0 | 259.725 | −290.465 | −76.986 |

TABLE 2C

FREE-FORM SURFACE

| | Factor | | | | | | | |
|---|---|---|---|---|---|---|---|---|
| | X2Y0: | X0Y2: | X0Y3: | X4Y0: | X2Y2: | X0Y4: | X2Y3: | X0Y5: |
| First mirror | 5.8246E−03 | 1.7990E−02 | 2.3416E−04 | 2.3873E−04 | −1.6476E−04 | 9.8447E−05 | −3.1342E−05 | 1.2074E−05 |

| | Factor | | | | | | |
|---|---|---|---|---|---|---|---|
| | X6Y0: | X4Y2: | X2Y4: | X0Y6: | X4Y3: | X2Y5: | X0Y7: |
| First mirror | −3.1938E−05 | 1.4680E−05 | −3.2738E−06 | 5.0256E−07 | 1.2129E−06 | −1.7277E−07 | 1.3903E−09 |

| | Factor | | | | | | | |
|---|---|---|---|---|---|---|---|---|
| | X2Y0: | X0Y2: | X0Y3: | X4Y0: | X2Y2: | X0Y4: | X2Y3: | X0Y5: |
| Second mirror | −1.5443E−02 | −2.4701E−02 | 3.0196E−04 | −1.1202E−04 | −6.1758E−04 | 5.2408E−05 | −1.3291E−04 | −4.5645E−06 |

| | Factor | | | | | | |
|---|---|---|---|---|---|---|---|
| | X6Y0: | X4Y2: | X2Y4: | X0Y6: | X4Y3: | X2Y5: | X0Y7: |
| Second mirror | −2.8307E−07 | 2.7091E−06 | −1.4624E−05 | −2.3408E−06 | 2.3187E−07 | −6.2742E−07 | −1.2882E−07 |

TABLE 2D

| DEFLECTIVE SCANNING DEVICE | | | |
|---|---|---|---|
| H-scanning mechanical angle | ±5.73 deg. | H-direction time utilization factor | 75% |
| V-scanning mechanical angle | ±6.00 deg. | V-direction time utilization factor | 80% |

Figure 11A:
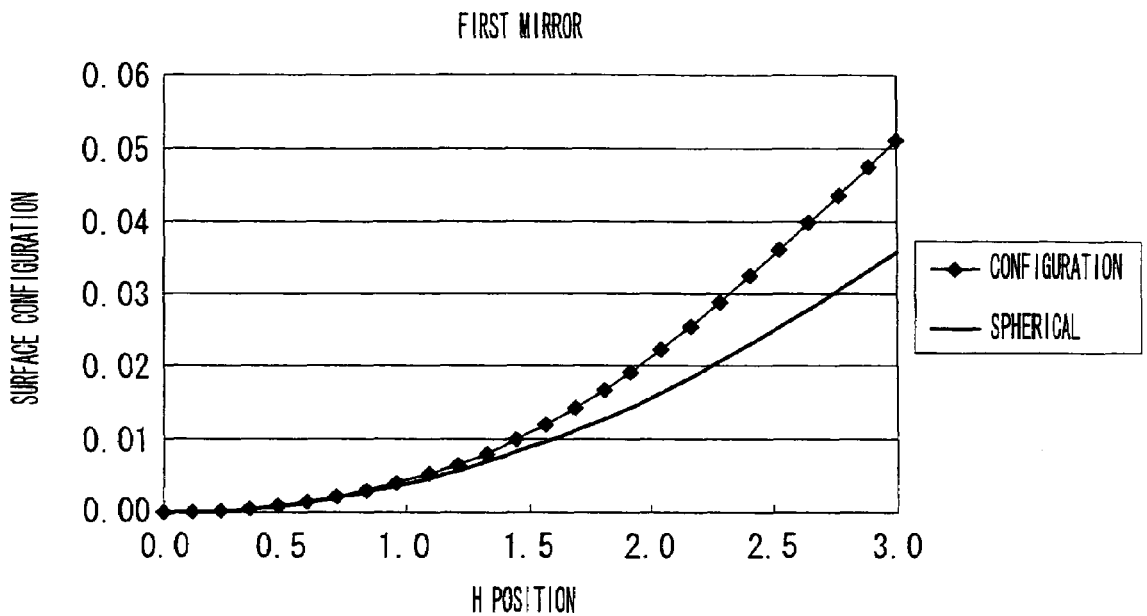
FIG. 11A is a graph showing an H-direction cross-sectional configuration of a first mirror 41.
Figure 11B:
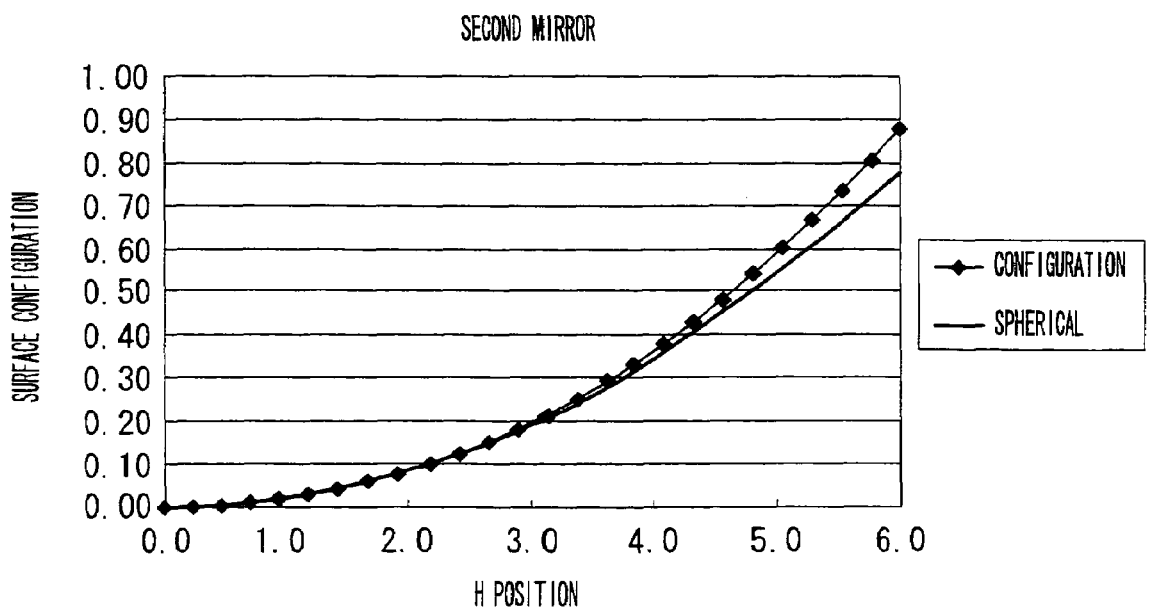
FIG. 11B is a graph showing an H-direction cross-sectional configuration of a second mirror 42.

FIG. 11A is a graph showing an H-direction cross-sectional configuration of the first mirror 41, and FIG. 11B is a graph showing an H-direction cross-sectional configuration of the second mirror 42. The vertical axis represents a normalized distance from a tangential line at a scan center, while the horizontal axis represents a normalized position on which the principal ray impinges. The projection optical system is expressed by synthesization of the power of the first mirror 41 and the power of the second mirror 42.

As seen from FIG. 11A, the H-direction configuration of the first mirror 41 has a larger curvature, compared with a spherical surface. Meanwhile, as seen in FIG. 4B, the H-direction configuration of the second mirror 42 also has a larger curvature, compared with a spherical surface. The synthetic optical system of the two mirrors is so designed as to have an arcsine characteristic and increase in the difference from the spherical surface toward the peripheral portions with the positive power increasing.

In this embodiment, with respect to the focal length of the first mirror 41 and the position of the light source image, an object distance S1H of the light source image formed by the incident optical system from the first mirror 41, as measured in the H direction, is 12.6 mm, an object distance S1V of the light source image formed by the incident optical system from the first mirror 41, as measured in the V direction, is −50.5 mm, an optical path length L12 of the optical-axis principal ray between the first mirror 41 and the second mirror 42 is 28 mm, a focal length f1H of the first mirror 41 in the vicinity of the optical-axis principal ray, as measured in the H direction, is 62.8 mm, and a focal length f1V of the first mirror 41 in the vicinity of the optical-axis principal ray, as measured in the V direction, is 13.36 mm.

Accordingly, the value of (S1H×f1H)/(S1H+f1H)/L12 in the foregoing equation (1) is calculated as 0.375, which satisfies the equation (1) and equation (1a).

Also, the value of (S1V×f1V)/(S1V+f1V)/L12 in the equation (2) is calculated as 0.649, which satisfies the equation (2) and the equation (2a).

Also, the value of f1V/f1H in the equation (3) is calculated as 0.213, which satisfies the equation (3) and the equation (3a).

Thus, in the projection optical system according to this embodiment, the light source image in the H direction and the light source image in the V direction are formed intermediate between the first mirror 41 and the second mirror 42, so that the second mirror 42 can be reduced in size.

Next, with respect to the object distance in this embodiment, the pupil diameter d of the laser projection apparatus is φ1.0 mm, the distance from the scanning position to the light source image is 26.6 mm in the H direction and −36.5 mm in the V direction. Therefore, the object distance Sh in the H direction is 26.6, which satisfies the conditional equation (11). Also, because the object distance Sv in the V direction is −36.5, the value of 1/Sv becomes −0.0274, which satisfies the conditional equation (13).

Further, the ratio in absolute value of H-direction power to V-direction power of the incident optical system is 4.35, which satisfies the conditional equation (12).

From the above description, any tilt of the image surface of the light source image caused by the projection optical system in this embodiment can be compensated successfully.

Figure 12:
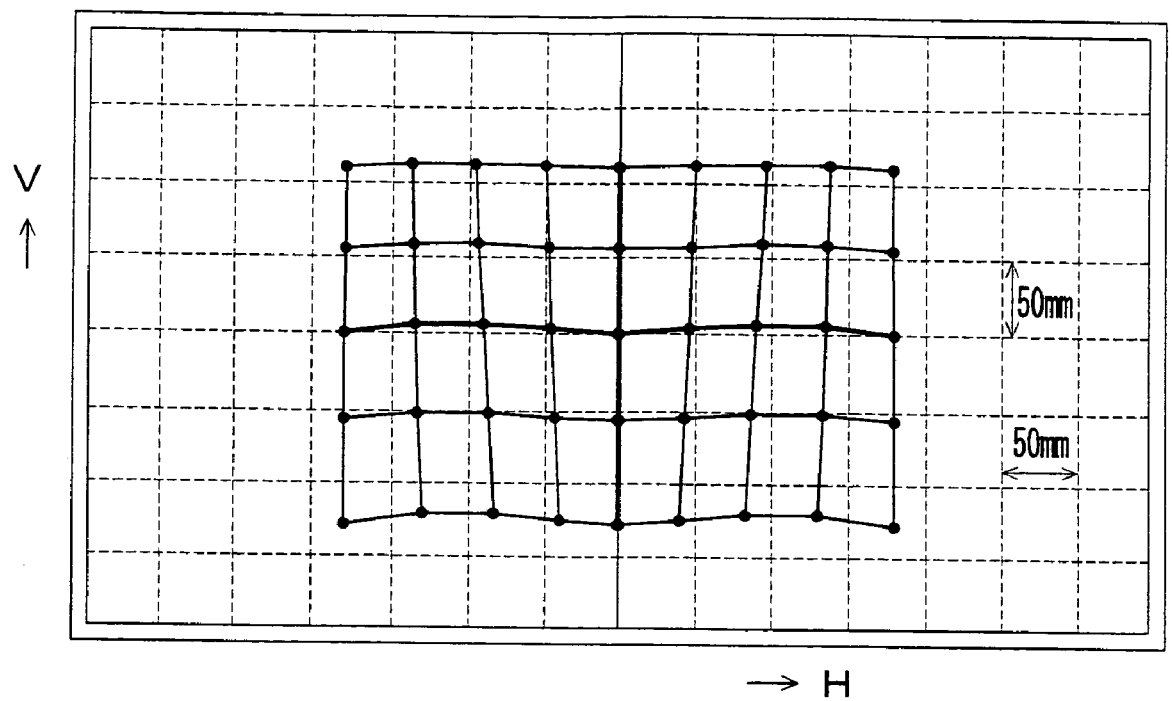
FIG. 12 is a graph showing distortion of the scanning grid on the screen SC.
Figure 13:
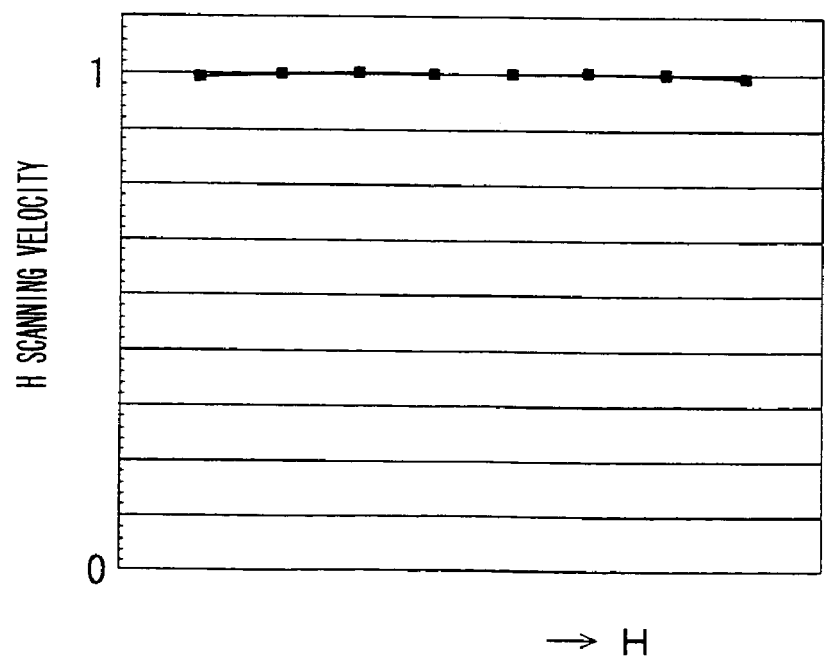
FIG. 13 is a graph showing variations in scanning velocity on the screen SC.

FIG. 12 is a graph showing distortion of the scanning grid on the screen SC. The vertical axis represents a vertical position on the screen SC, while the horizontal axis represents a horizontal position on the screen SC. FIG. 13 is a graph showing variations in scanning velocity on the screen SC. The vertical axis represents the scanning velocity in the H direction on the screen SC, while the horizontal axis represents the horizontal position on the screen SC.

As can be understood from FIGS. 12 and 13, in spite of a very large utilization factor as much as 75% in the H direction, velocity uniformity and distortion are successfully compensated.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser projection apparatus comprising:
   a laser light source;
   an incident optical system which is supplied with a light beam from the laser light source;
   a scanning device for two-dimensionally scanning the light beam from the incident optical system; and
   a projection optical system for projecting the light beam from the scanning device onto a screen,
   wherein the scanning device includes a resonant drive mirror for performing deflection in a main scanning direction, and
   the projection optical system includes at least two nonaxisymmetric-shaped reflecting surfaces, and a light source image is present between the first reflecting surface, which is most closest to the scanning device, and the second reflecting surface.

2. The laser projection apparatus according to claim 1, wherein the projection optical system has such a power that, with respect to the main scanning direction, a positive power becomes increasingly greater toward peripheries of the main scanning direction.

3. The laser projection apparatus according to claim 2, wherein the first reflecting surface of the projection optical system has a positive power, and satisfies the following equation:

$$0 < (S1H \times f1H)/(S1H + f1H)/L12 < 1.0,$$

where L12 represents an optical path length of an optical-axis principal ray between the first reflecting surface and the second reflecting surface, f1H represents a focal length of the first reflecting surface in a vicinity of the optical-axis principal ray, as measured in the main scanning direction, and S1H represents an object distance of the light source image formed by the incident optical system from the first reflecting surface, as measured in the main scanning direction.

4. The laser projection apparatus according to claim 2, wherein the first reflecting surface of the projection optical system has a positive power and satisfies the following equation:

$$0<(S1V \times f1V)/(S1V+f1V)/L12<1.0,$$

where L12 represents an optical path length of an optical-axis principal ray between the first reflecting surface and the second reflecting surface, f1V represents a focal length of the first reflecting surface in a vicinity of the optical-axis principal ray, as measured in the sub scanning direction, and S1V represents an object distance of the light source image formed by the incident optical system from the first reflecting surface, as measured in the sub scanning direction.

5. The laser projection apparatus according to claim 2, wherein the first reflecting surface of the projection optical system satisfies the following equation:

$$0<f1V/f1H<1,$$

where f1H represents a focal length of the first reflecting surface in a vicinity of the optical-axis principal ray, as measured in the main scanning direction, and f1V represents a focal length of the first reflecting surface in a vicinity of the optical-axis principal ray, as measured in the sub scanning direction.

6. The laser projection apparatus according to claim 1, wherein the incident optical system has a power in the main scanning direction and a power in the sub scanning direction, one power being different from another power.

7. The laser projection apparatus according to claim 6, wherein the incident optical system supplies the scanning device with light convergent in the main scanning direction.

8. The laser projection apparatus according to claim 6, wherein the incident optical system satisfies the following equation:

$$20<Sh/d<80,$$

where Sh represents an object distance in the main scanning direction which is a distance from the scanning device to the light source image formed by the incident optical system, as measured in the main scanning direction, and d represents a pupil diameter.

9. The laser projection apparatus according to claim 6, wherein the incident optical system satisfies the following equation:

$$|0.05|>d/Sv,$$

where Sv represents an object distance in the sub scanning direction which is a distance from the scanning device to the light source image formed by the incident optical system, as measured in the sub scanning direction, and d represents a pupil diameter.

10. The laser projection apparatus according to claim 6, wherein the incident optical system satisfies the following equation:

$$1.2<PwH/PwV<7.0,$$

where PwH represents an absolute value of the incident optical system power, as measured in the main scanning direction, and PwV represents an absolute value of power of the incident optical system, as measured in the sub scanning direction.

* * * * *